(12) United States Patent
Keszei et al.

(10) Patent No.: US 11,563,698 B2
(45) Date of Patent: Jan. 24, 2023

(54) PACKET VALUE BASED PACKET PROCESSING

(71) Applicant: Telefonaktiebolaget LM Ericsson (publ), Stockholm (SE)

(72) Inventors: Csaba Keszei, San Jose, CA (US); Szilveszter Nádas, Budapest (HU); Zoltan Kiss, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/768,300

(22) PCT Filed: Nov. 30, 2017

(86) PCT No.: PCT/SE2017/051199
§ 371 (c)(1),
(2) Date: May 29, 2020

(87) PCT Pub. No.: WO2019/108102
PCT Pub. Date: Jun. 6, 2019

(65) Prior Publication Data
US 2021/0194832 A1   Jun. 24, 2021

(51) Int. Cl.
*H04L 49/90* (2022.01)
*H04L 47/32* (2022.01)

(52) U.S. Cl.
CPC .......... *H04L 49/9084* (2013.01); *H04L 47/32* (2013.01)

(58) Field of Classification Search
CPC . H04L 47/10; H04L 47/2408; H04L 47/2416; H04L 47/2441; H04L 47/283; H04L 47/32; H04L 49/90; H04L 49/9015; H04L 49/9084; H04L 49/9094
See application file for complete search history.

(56) References Cited

U.S. PATENT DOCUMENTS

| 8,203,956 B1 | 6/2012 | Milliken |
| 2005/0089042 A1 | 4/2005 | Ruutu et al. |

(Continued)

FOREIGN PATENT DOCUMENTS

WO   2014/189422 A1   11/2014

OTHER PUBLICATIONS

International Search Report and Written Opinion, PCT App. No. PCT/SE2017/051199, dated Jul. 3, 2018, 12 pages.

(Continued)

*Primary Examiner* — Jason E Mattis
*Assistant Examiner* — Bao G Nguyen
(74) *Attorney, Agent, or Firm* — Nicholson De Vos Webster & Elliott LLP

(57) ABSTRACT

Embodiments of the invention include methods for handling packets in a communications network. In one embodiment, a method is implemented in an electronic device. The method includes at a first end of a queue in the electronic device, determining admission of a first packet to the first end of the queue based on a length of the first packet, where when the admission of the first packet would cause the queue to become full, the admission is further based on a packet value of the first packet and a data structure tracking packet value distribution of packets in the queue. The method further includes at a second end of the queue, dropping a second packet from the second end of the queue when the second packet's corresponding packet value is marked as to be dropped in the data structure upon admitting packets to the first end of the queue.

20 Claims, 9 Drawing Sheets

(56) References Cited

U.S. PATENT DOCUMENTS

| | | | |
|---|---|---|---|
| 2005/0240745 A1* | 10/2005 | Iyer | G06F 12/0607 |
| | | | 711/167 |
| 2006/0262720 A1* | 11/2006 | Charny | H04L 47/10 |
| | | | 370/229 |
| 2015/0117205 A1 | 4/2015 | Palyi et al. | |
| 2016/0065477 A1* | 3/2016 | White | G06F 9/5083 |
| | | | 370/237 |
| 2020/0127933 A1 | 4/2020 | Nadas et al. | |

OTHER PUBLICATIONS

Laki et al., "Take your own share of the PIE", ANRW '17: Proceedings of the Applied Networking Research Workshop, Jul. 15, 2017, 6 pages.

Nadas et al., "Per Packet Value: A Practical Concept for Network Resource Sharing", 2016 IEEE Global Communications Conference (GLOBECOM), 2016, 7 pages.

International Preliminary Report on Patentability, PCT App. No. PCT/SE2017/051199, dated Jun. 11, 2020, 10 pages.

Office Action, EP App. No. 17818650.8, dated May 26, 2021, 4 pages.

Intention to Grant, EP App. No. 17818650.8, dated May 13, 2022, 6 pages.

Decision to Grant a European Patent, EP App. No. 17818650.8, dated Sep. 8, 2022, 2 pages.

\* cited by examiner

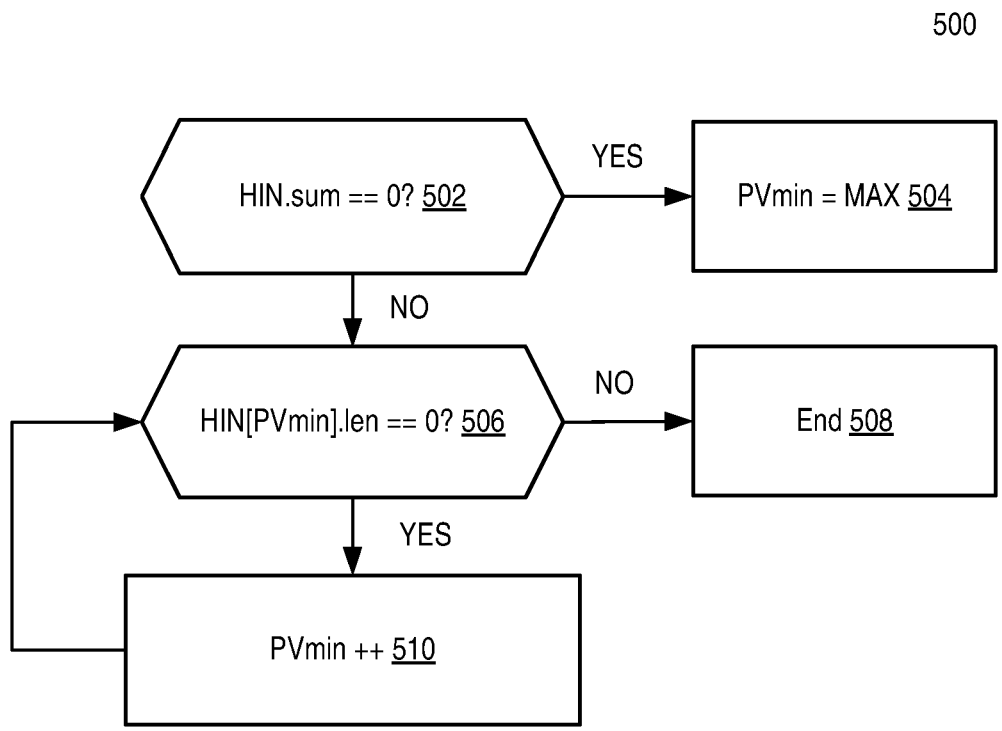
Fig. 5
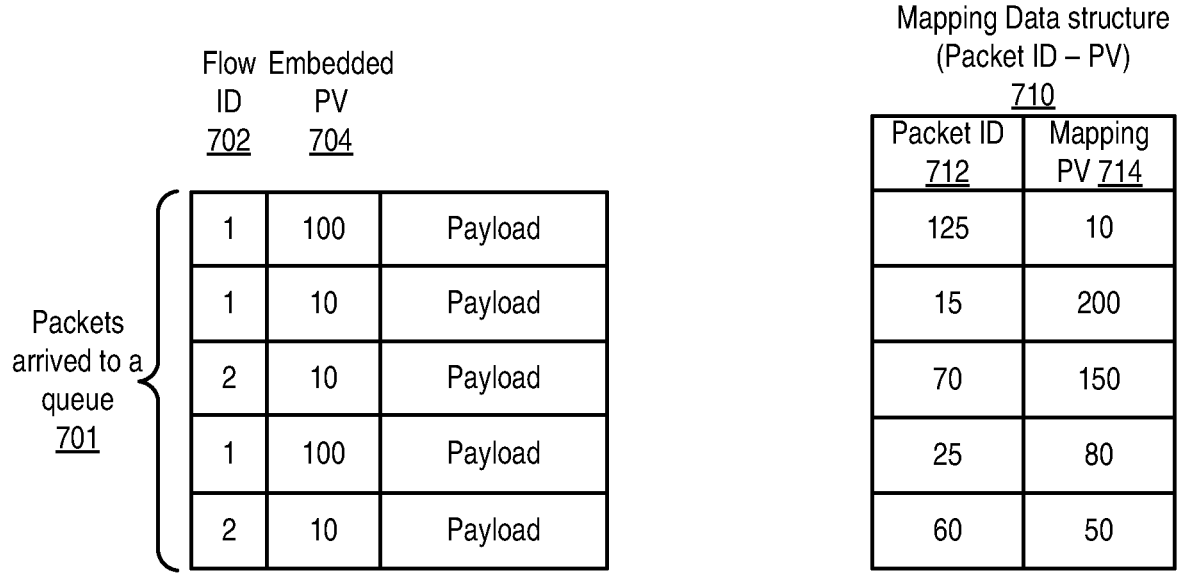
Fig. 7A
Fig. 7B

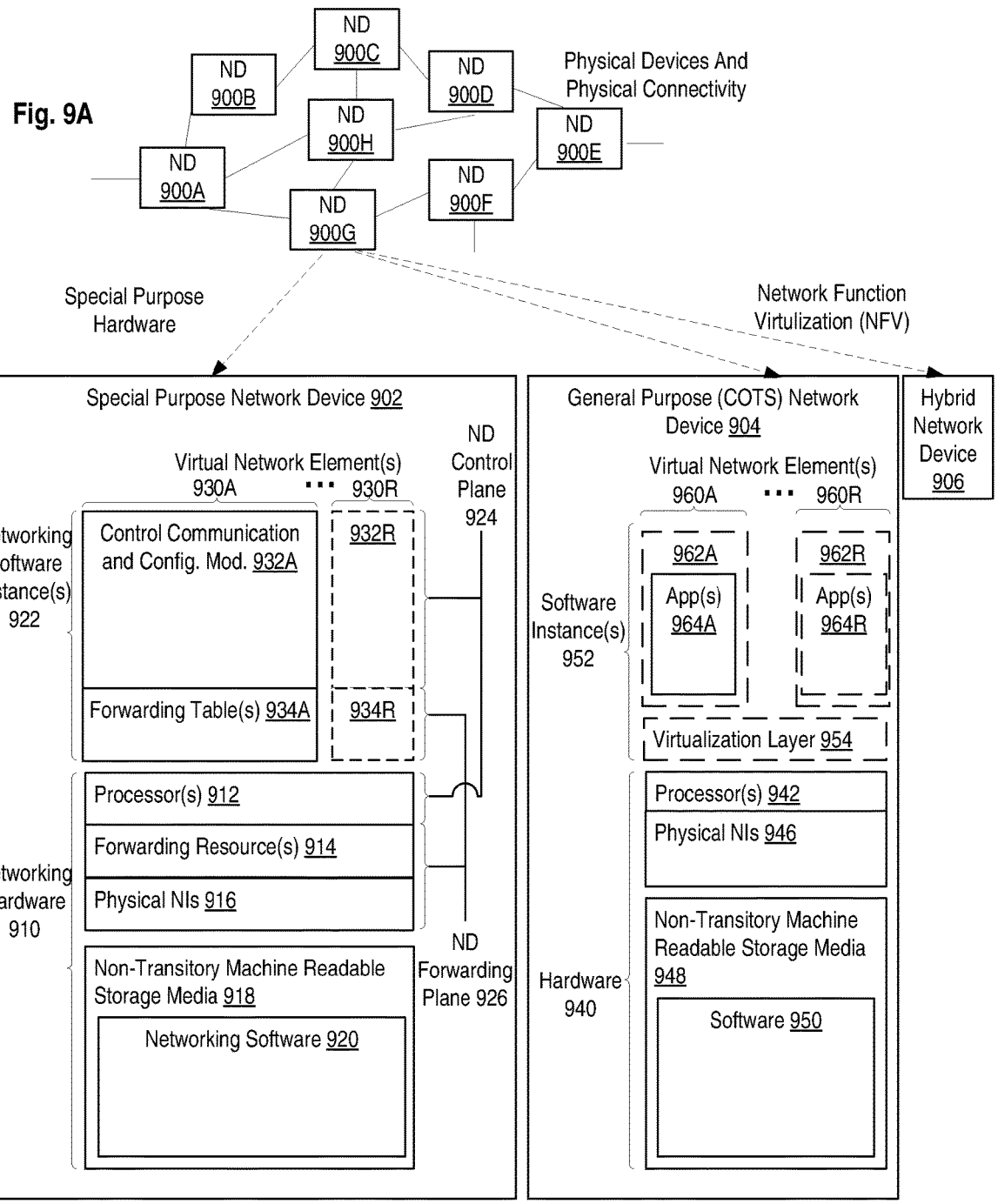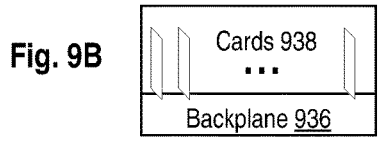

PACKET VALUE BASED PACKET PROCESSING

CROSS-REFERENCE TO RELATED APPLICATIONS

This application is a National stage of International Application No. PCT/SE2017/051199, filed Nov. 30, 2017, which is hereby incorporated by reference.

TECHNICAL FIELD

Embodiments of the invention relate to the field of communications networking; and more specifically, to the packet processing in a communications network.

BACKGROUND

A communications network may include a number of nodes, each processing packets. A node has limited packet processing capability, and when packet arrivals get over the packet processing capability, the node becomes a bottleneck, and some packets are dropped due to congestion at the node. To get around the congestion, a few solutions have been proposed.

One solution is for a network operator to preconfigure rules for sharing the desired packet processing sources in a node, and to implement the rules at the node prior to the arrival of packets of a traffic flow. Following the rules, the node then schedules its packet resources to process the traffic flow, along with other traffic flows arriving at the node. While a pre-configuration approach may describe a rich set of resource sharing rules, the rules have to be signaled to the node before the first packet of the traffic flow arrives. Additionally, the rules have to be configured at all the nodes that could cause congestion. If the rules need to be updated, all the nodes that could cause congestion need to be reconfigured. With the pre-configuration and re-configuration, the pre-configuration based approach can be complicated and costly.

Another solution is to mark packets with drop precedence, which indicates the relative importance of packets comparing to each other. The drop precedence is typically marked at the traffic flow level. A node drops packets with high drop precedence before dropping packets with low drop precedence. A drop precedence based approach is often simpler and less costly than a pre-configuration based approach. Yet it is challenging to implement a proper interpretation of the drop precedence to yield the efficient usage of packet processing resources in a node.

SUMMARY

Embodiments of the invention include methods for handling packets in a communications network. In one embodiment, a method is implemented in an electronic device in a communication network. The method includes at a first end of a queue in the electronic device, determining admission of a first packet to the first end of the queue based on a length of the first packet, where when the admission of the first packet would cause the queue to become full, the admission is further based on a packet value of the first packet and a data structure tracking packet value distribution of packets in the queue. The method further includes at a second end of the queue in the electronic device, dropping a second packet from the second end of the queue when the second packet's corresponding packet value is marked as to be dropped in the data structure upon admitting packets to the first end of the queue or serving the second packet otherwise.

Embodiments of the invention include electronic devices to handle packets in a communication network. In one embodiment, an electronic device comprises a non-transitory machine-readable medium to store instructions and a processor coupled with the non-transitory machine readable medium to process the stored instructions to: at a first end of a queue in the electronic device, determine admission of a first packet to the first end of the queue based on a length of the first packet, where when the admission of the first packet would cause the queue to become full, the admission is further based on a packet value of the first packet and a data structure tracking packet value distribution of packets in the queue; at a second end of the queue in the electronic device, drop a second packet from the second end of the queue when the second packet's corresponding packet value is marked as to be dropped in the data structure upon admitting packets to the first end of the queue, or serve the second packet otherwise.

Embodiments of the invention include non-transitory machine-readable storage media for handling packets in a communications network. In one embodiment, a non-transitory machine-readable medium provides instructions, which when executed by a processor of an electronic device, cause the processor to perform operations comprises the following: at a first end of a queue in the electronic device, determining admission of a first packet to the first end of the queue based on a length of the first packet, where when the admission of the first packet would cause the queue to become full, the admission is further based on a packet value of the first packet and a data structure tracking packet value distribution of packets in the queue; at a second end of the queue in the electronic device, dropping a second packet from the second end of the queue when the second packet's corresponding packet value is marked as to be dropped in the data structure upon admitting packets to the first end of the queue, or serve the second packet otherwise.

Embodiments of the invention provide efficient ways to process packets based on their respective packet values and a data structure tracking packet value distribution of the packets. Since it does not require dropping packets that is in the middle of the queue and other pre-tuning, embodiments of the invention can be implemented with a low latency.

BRIEF DESCRIPTION OF THE DRAWINGS

The invention may best be understood by referring to the following description and accompanying drawings that are used to illustrate embodiments of the invention. In the drawings:

FIG. 5 is a flow diagram illustrating the tracking of the minimum packet value per one embodiment of the invention.

FIGS. 7A-B illustrate different ways that packet values may be conveyed per embodiments of the invention.

FIG. 9A illustrates connectivity between network devices (NDs) within an exemplary network, as well as three exemplary implementations of the NDs, according to some embodiments of the invention.

FIG. 9B illustrates an exemplary way to implement a special-purpose network device according to some embodiments of the invention.

DETAILED DESCRIPTION

Figure 1:
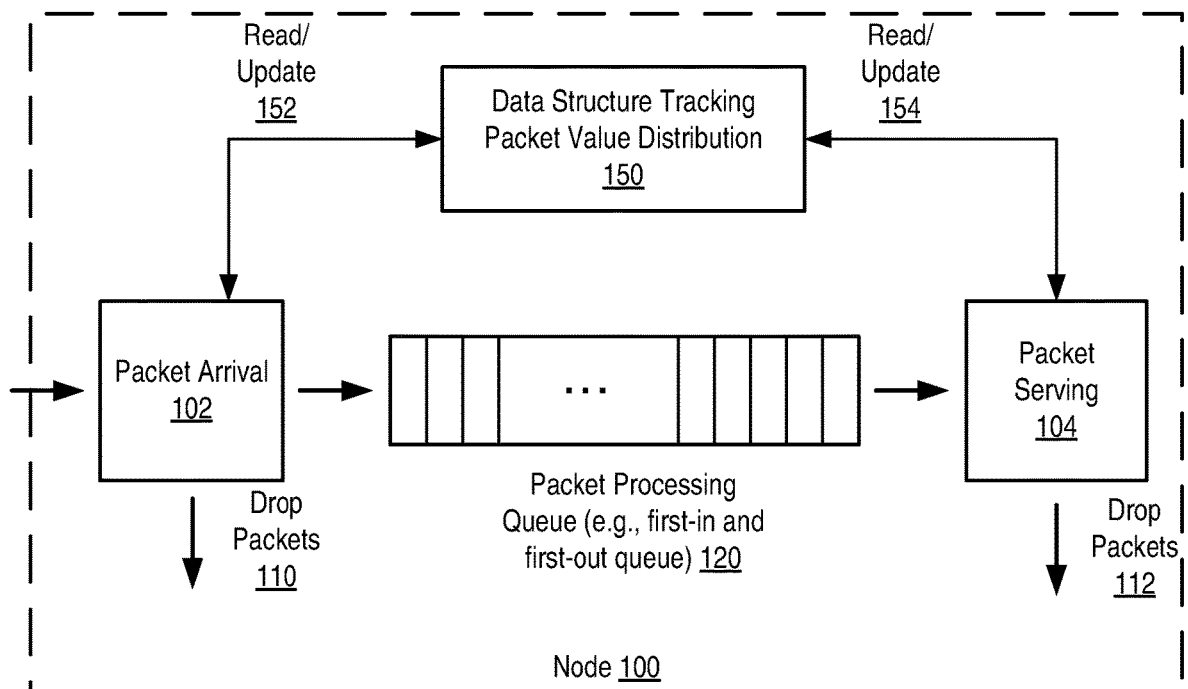
FIG. 1 illustrates entities for the operations of packet value based packet processing per one embodiment of the invention.

The following description describes methods and apparatus for process packets based on their respective packet values and a data structure tracking packet value distribution of the packets. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order to not obscure the invention. Those of ordinary skill in the art, with the included descriptions, will be able to implement appropriate functionality without undue experimentation.

Term

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., where a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). A network device may communicate with the other electronic devices through radio and/or landline communications networks.

A traffic flow (or data flow, flow) is traffic of packets identified by a set of header information and port information including, but not limited to: IP header, Layer 2 (L2) header, virtual and/or physical interface port, and/or agent circuit ID information for a remote port in an access network. A data flow may be identified by a set of attributes embedded to one or more packets of the flow. An exemplary set of attributes includes a 5-tuple (source and destination IP addresses, a protocol type, source and destination TCP/UDP ports).

A packet value (PV) is a value assigned to each packet, and is also referred to as a per packet value (PPV). A packet value is a scalar value and enables nodes to perform computations on these values, such as summing up the values for a total value or dividing the values to reflect higher cost of transmission. The packet values not only express which packet is more important, but also by how much. This is in contrast to existing drop precedence markings, which simply define categories of drop levels, where the individual drop level categories are merely ordered, but further relation among them is not expressed. In embodiments of the invention, a whole packet has the same value, but the representation of the value may be a value of a single bit of that packet. In one embodiment, the packet value indicates a drop precedence of a packet. The value marked for the packet may be the value of the single bit times bit length. The coding of the value may be linear, logarithmic or based on a mapping table. In other words, the packet value for a packet may be embedded within the packet, but it also may be indicated outside of the packet (e.g., a mapping table within a network device to map packets of one traffic flow to one packet value). While packets of the same traffic flow may share the same packet value in one embodiment, they may have different packet values in an alternative embodiment (e.g., packets of a video traffic flow may assign different packet values to different layers of the video traffic flow).

Operations of Packet Value Based Packet Processing

In one node that is experiencing packet congestion, the packet values of the packets may be used to determine which packet to drop (also referred to as discard, remove, remove without being served, reject, dump, expel, etc.). For example, the node may determine whether to drop a packet depending on (1) the packet value of the packet, and (2) the expected amount of resources to serve the packet. The packet with a higher drop precedence (thus lower priority) and/or requiring more resources will be dropped prior to dropping the packet with a lower drop precedence and/or requiring few resources. One drawback of such approach, however, is that packets may be dropped in the middle of a queue, and such packet drop may be processing intensive for some networks. For example, the packet drop may require a search tree, where insertion and removal is $O(\log(n))$ complexity.

In an alternative approach, the node may determine whether to drop a packet depending on whether the packet may cause too much delay. For example, the node may determine a deviation of a queueing delay from a target queueing delay value and use this deviation as an error value to determine a dropping probability, which is then used to determine a threshold value. The node compares the packet value with the threshold value and decide whether to drop the packet. This approach has low complexity (only $O(1)$), yet the computation requires complex pre-tuning of the control loops and it is hard to prove that these control loops perform well in all scenarios (e.g., scenarios with diverse bottleneck capacities and traffic mix).

Embodiments of the invention overcome the drawbacks of the previous approaches by utilizing a data structure that tracks packet value distribution of packets in a queue of a node. FIG. 1 illustrates entities for the operations of packet value based packet processing per one embodiment of the invention. The node 100, along with other nodes discussed in this specification, may be implemented in a network device. In one embodiment, all the entities may be within the node 100 of a communications network, which may be a radio or landline communications network. In an alternative embodiment, some entities (e.g., the data structure tracking packet value distribution 150) are outside of, but accessible by the node 100.

Packets arrive at the packet arrival block 102. The packet arrival block 102 may be a part of a transceiver interface of the node 100 in one embodiment. The arrived packets are assumed to be already marked with packet values. The marking of a packet with a packet value may be performed at an edge communication node, where the packet value indicates the relative importance of the packet. The marking of the packet with the packet value may also be performed by the node 100, before arriving at the packet arrival block 102.

The arrived packets are then either put in a packet processing queue 120 or dropped at 110. The decision of whether to enqueue the packet at one end of the queue or to drop it depends on factors such as the packet length and/or packet value as discussed in more details below. The packet processing queue 120 is a first-in and first-out (FIFO) queue (sometimes referred to as first-come and first-served, FCFS) in one embodiment. Note that the queue 120 is shared among the packets of different traffic flows. Thus, packets within the queue 120 may have different packet values. Also note that the node 100 may have multiple packet processing queues. For example, each of the multiple queues may be dedicated to certain types of traffic flows. Packet processing queue 120 is just an example of a packet processing queue that contains packets with different packet values. The packet processing queue 120 may be implemented by a buffer, cache, and/or one or more other machine-readable memory storage media discussed above relating to the definition of the electronic device.

The packet processing queue 120 has a maximum queue length, and it does not hold packet or packets that have a total length longer than the maximum queue length. The maximum queue length, is the amount of data volume the queue can output in a given period of time in one embodiment. In other words, it is the throughput of the bottleneck scaled for a chosen timescale.

Once the queue reaches its maximum queue length and new packets arrives, either the new packet is dropped without entering the queue or the node makes room in the queue for the new packet.

Note that a queue length or a packet length is often measured in bits, bytes/octets (8 bits), halfwords (16 bits), words (32 bits), or doublewords (64 bits). The embodiments of the invention are agnostic to the measurement of the queue (queue length), and for simplicity of explanation, the following discussion use bytes for the queue length.

The node 100 determines whether to accept an arrived packet to the queue, and the determination may be based on the data structure tracking packet value distribution 150 (the illustrated reading 152 the data structure). Once the node makes the determination, it updates the data structure 150 reflecting the determination (the illustrated updating 152 the data structure).

At the other end of the queue 120, the packet serving block 104 serves the packets in the queue. The serving block 104 may be a part of a processor (e.g., an execution unit of a central processor unit (CPU), a graphics processing unit (GPU), a digital signal processor (DSP), or microcontroller). The packet serving block 104 may either serve the packets at the other end of the queue 120 or drop the packets based on the information from the data structure 150 (the illustrated reading 154 the data structure). The packet serving block 104 then updates the data structure 150 (the illustrated updating 154 the data structure). Note that serving (may also be referred to as processing or executing) a packet may include a variety of packet processing operations such as one or more of forwarding the packet, revising the packet's header, encrypting the packet, compressing the packet, and extracting/revising the payload.

Figure 2:
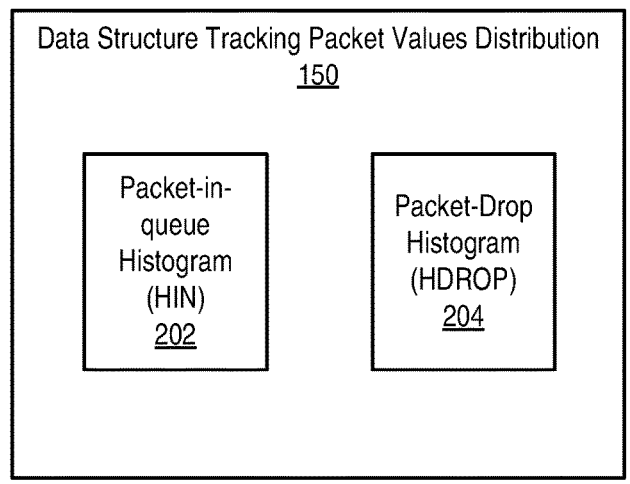
FIG. 2 illustrates a data structure tracking packet value distribution per one embodiment of the invention.

In one embodiment, the data structure tracking packet value distribution 150 includes histograms. A histogram tracks distribution of numerical data. While a histogram may be presented as a graphic for human consumption, it may be presented merely as data distribution for operations within a node. The histograms in this Specification tracks distribution of packet values, presented graphically or otherwise. FIG. 2 illustrates a data structure tracking packet value distribution per one embodiment of the invention. The data structure tracking packet value distribution 150 includes two histograms in one embodiment.

The first histogram tracks packet value distribution of packets in the queue of a node. The histogram is for packets that are currently in the queue, and we refer it as the packet-in-queue histogram (HIN) 202. For each packet value that one or more in-queue packets are marked with, the number of bytes within the one or more packets is tracked for the packet value in one embodiment. Thus, the packet-in-queue histogram 202 illustrates the cumulative size of packets (e.g., in bytes) that is to be served. For the HIN 202, the minimum packet value (PVmin) of packet values for the packets currently in the queue is tracked so that the node may determine which packet to be enqueued. Since the node may sort the packet-in-queue histogram packet, the PVmin may be obtained with insignificant processing resource.

The second histogram tracks packet value distribution of packets that are to be dropped when the packets reach the packet serving block 104, and we refer it as the packet-drop histogram (HDROP) 204. The packet-drop histogram (HDROP) 204 is updated when a packet value is determined to correspond to packets that are to be dropped as discussed in more details below.

The histograms are updated when the packet status changes (e.g., a packet is dropped or served), and the node 100 maintains the histograms to be up to date. Using the histograms (or other data structures that track packet value distribution), the node 100 may process packets efficiently without dropping a packet in the middle of a queue or performing complex pre-tuning of control loops.

Flow Diagrams

The operations in the flow diagrams will be described with reference to the exemplary embodiments of the other figures such as FIGS. 1-2. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3:
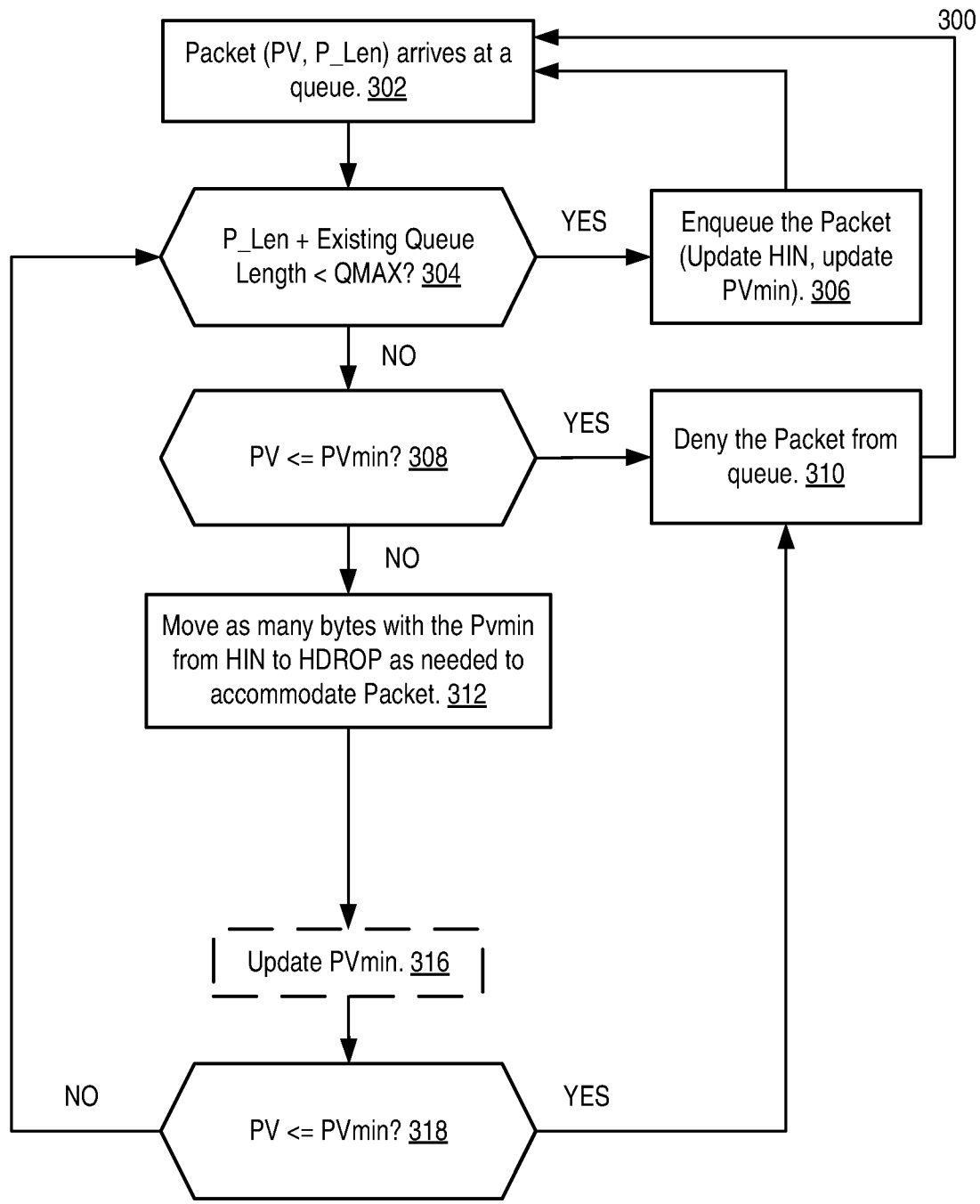
FIG. 3 is a flow diagram illustrating the packet enqueue process per one embodiment of the invention.

FIG. 3 is a flow diagram illustrating the packet enqueue process per one embodiment of the invention. Method 300 may be performed within an electronic device such as the node 100. The queue for the packets to enter is the queue 120 in one embodiment. The operations determine whether to enqueue an incoming packet or drop the packet without entering it to the queue.

At reference 302, a packet arrives at the queue. The packet has a certain packet value (PV) and a certain packet length (P_len). As discussed herein above, the packet value may be marked within the electronic device itself, or it may be marked by anther electronic device.

At reference 304, the electronic device determines whether the sum of packet lengths of the existing packets in the queue and the packet length of the newly arrived packet would reach the maximum queue length (QMAX). If the sum is less than the maximum queue length, the flow goes to reference 306, and the packet is enqueued in the queue. In one embodiment, a packet-in-queue histogram (e.g., the HIN 202) is updated to reflect the newly added packet in the queue. If the packet value (PV) is not in the packet-in-queue histogram already, a new entry for the packet value is added in the histogram, and the packet length (P_len) is indicated to be the total byte length for the packet value. Note that a data structure such as the packet-in-queue histogram may include all valid packet values, and the packet length is initialized to be zero and then accumulated as packets arrive.

For example, an entry in the histogram may be represented by something like (PV=100, Byte length=40) when it is for the packet, PV=100 and P_len=40 bytes. If the packet value 100 is already in the packet-in-queue histogram, the byte length for the packet value is increased by the P_len. For example, if PV=100 is in the histogram and the byte length is 250 for PV=100, after the new packet is enqueued, the entry in the histogram may be represented by something like (PV=100, Byte length=290). That is the new byte length at PV=100 includes the byte length of the newly admitted packet. Additionally, the node checks the minimum PV (PVmin) of the existing packets within the queue. If the newly arrived packet is the first packet of the queue, PV=100 may be set to be PVmin. Otherwise, PV is compared with the current PVmin. If PV=100 is smaller than the existing PVmin, PVmin is updated to be PV; otherwise, PVmin is intact. Once the packet is enqueued, the flow goes back to reference 302, waiting for another packet to arrive.

If at reference 304, the electronic device determines that the sum is larger than the maxim queue length, the flow goes to reference 308. At reference 308, the PV of the newly arrived packet is compared to PVmin. If the PV is not larger than PVmin, the flow goes to reference 310, and the newly arrived packet is denied from entering the queue thus dropped. Once the packet is dropped, the flow goes back to reference 302, waiting for another packet to arrive.

If at reference 308, the electronic device determines that the PV is larger than PVmin, then at reference 312, the electronic device moves as many bytes having the packet value being PVmin to a packet-drop histogram such as the HDROP 204 as needed to accommodate the newly arrived packet. For example, assume that PVmin is 90 and its corresponding byte length is 30 in the packet-in-queue histogram. When the packet (PV=100, P_len=40) arrives, at reference 312, all the 30 bytes corresponding to PVmin=90 is moved to the packet-drop histogram. When the bytes are moved to the packet-drop histogram, these bytes are indicated to be dropped.

At reference 316, the electronic device updates PVmin if necessary. For example, in the immediate preceding paragraph, the update of PVmin is necessary because all the 30 bytes corresponding to PVmin is moved to the packet-drop histogram, so that the second lowest packet value becomes the PVmin at reference 316. Yet if the PVmin is 90 and its corresponding byte length is 60 in the packet-in-queue histogram, since the new packet has (PV=100, Byte length=40), only 40 out of the 60 bytes need to be moved to the packet-drop histogram, and the PVmin remains at 90.

At reference 318, the electronic device determines again whether the packet value of the newly arrived packet is larger than PVmin (since PVmin may be updated at reference 316), and if PV is larger than PVmin, the flow goes back to reference 304, otherwise the flow goes to reference 310, and the packet is denied from entering the queue. Once the packet is dropped at reference 310, the flow goes back to reference 302, waiting for another packet to arrive.

Through simply tracking the packet value and packet length of the newly arrived packet, and in consideration of the minimum packet value and the packet lengths of the existing packets, the electronic device may determine whether to enqueue the newly arrived packet. These operations in method 300 do not require any pre-tuning of the control loops, and can be performed efficiently as the packet arrives.

Figure 4:
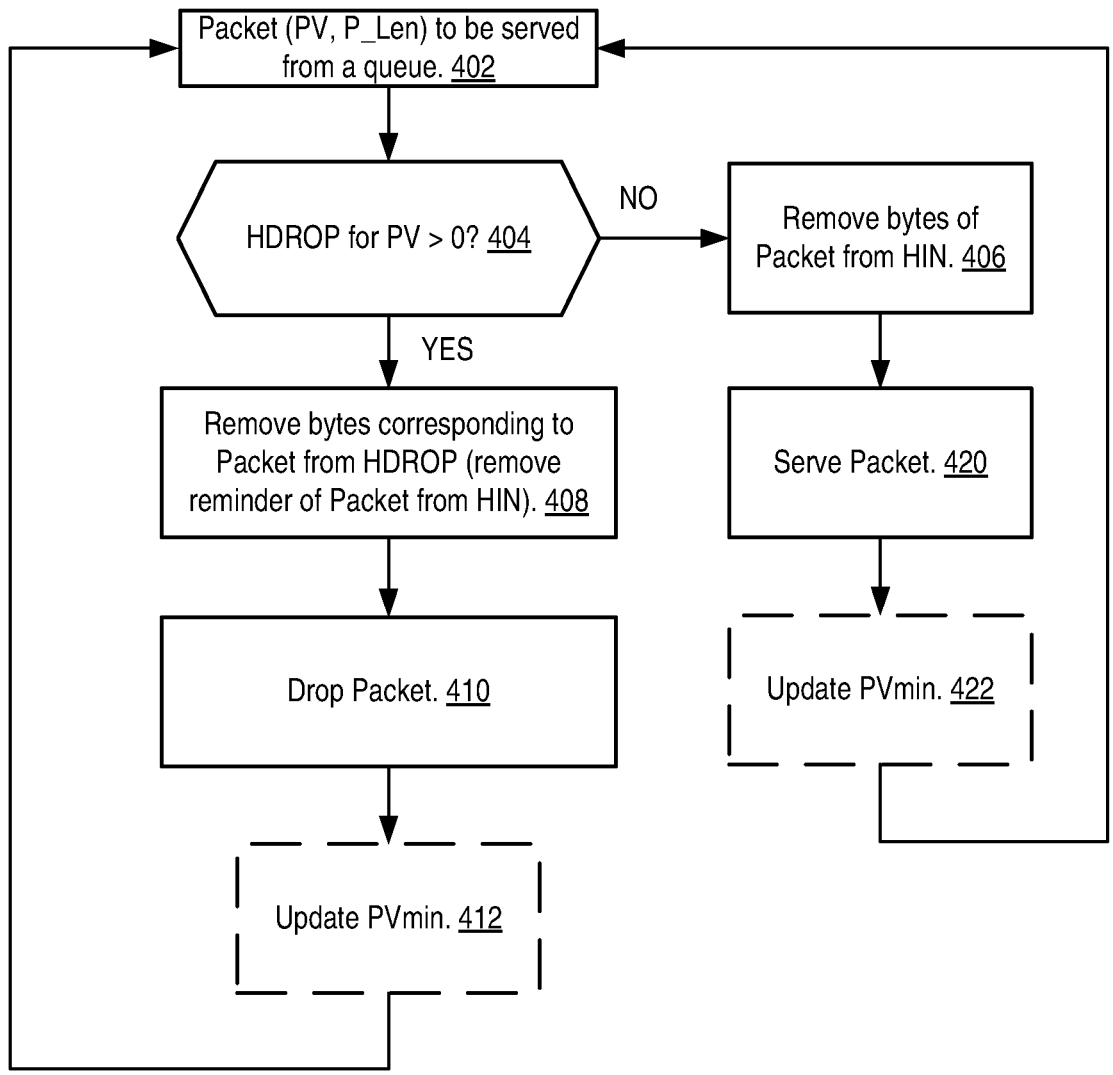
FIG. 4 is a flow diagram illustrating the packet dequeue process from a queue per one embodiment of the invention.

FIG. 4 is a flow diagram illustrating the packet dequeue process from a queue per one embodiment of the invention. Method 400 may be performed within an electronic device such as the node 100. The queue for the packets to exit is the queue 120 in one embodiment. The operations determine whether to serve a packet exiting the queue or drop the packet instead.

At reference 402, a packet to be served is exiting from a queue. The packet has a certain packet value (PV) and a certain packet length (P_len). At reference 404, the electronic device determines whether the packet value of the packet has any accumulated byte length in a packet-drop histogram such as the HDROP 204. As discussed at reference 312, bytes with earlier minimum packet value (PVmin) may be moved to the packet-drop histogram. The electronic device determines whether any byte associated with the packet value is in the packet-drop histogram.

If there is no byte associated with the packet value in the packet-drop histogram as determined at reference 404, the flow goes to reference 406. The bytes of the packet are removed from a packet-in-queue histogram (e.g., the HIN 202) that tracks packet distribution of the enqueued packets. At reference 420, the electronic device serves the packet.

Optionally at reference 422, the minimum packet value is updated when the packet value of the exiting packet has the minimum packet value and no other bytes remains for the minimum packet value. Otherwise, the minimum packet value stays the same. The flow then goes back to reference 402, and the electronic device determine whether to serve or drop the next exiting packet from the queue.

If there is any byte associated with the packet value in the packet-drop histogram as determined at reference 404, the flow goes to reference 408. The electronic device removes bytes corresponding to the packet from the packet-drop histogram at reference 410. In some cases, a packet has a portion of bytes that are tracked in the packet-drop histogram, and the remaining portion of the packet are tracked in the packet-in-queue histogram. In one embodiment, the electronic device removes the remaining portion of the packet in the packet-in-queue histogram also, since unlikely the remaining portion of the packet will be served properly. In this embodiment, the packet-in-queue histogram needs to be updated once the remaining portion of the packet is removed (e.g. reducing the byte length for the corresponding packet value by the number of bytes removed).

At reference 410, the packet is dropped without being served. Then optionally at reference 412, the minimum packet value is updated when the packet value of the exiting packet has the minimum packet value and no other bytes remaining for the minimum packet value. Otherwise, the minimum packet value stays the same. Then the flow goes back to reference 402, and the electronic device determine whether to serve or drop the next exiting packet from the queue.

Through simply tracking the packet values of packets exiting the queue, and in consideration of the packet values that are marked as to be dropped through a data structure such as the packet-drop histogram, the electronic device may determine whether to serve an exiting packet from the queue. These operations in method 400 may be performed quickly using value comparison and data structure reading/updating.

FIG. 5 is a flow diagram illustrating the tracking of the minimum packet value per one embodiment of the invention. Method 500 may be performed within an electronic device such as the node 100. The queue for the packets to exit is the queue 120 and the minimum packet value is tracked for a packet-in-queue histogram such as HIN 202 in one embodiment.

The flow starts at reference 502, where the electronic device determines whether the total byte length of a packet-in-queue histogram (HIN.sum) is zero. If it is, the flow goes to reference 504, and a maximum value (MAX) for the minimum packet value (PVmin) is assigned. The flow waits for the packet-in-queue histogram to be populated.

If the total byte length of a packet-in-queue histogram (HIN.sum) is not zero as determined at reference 502, the flow goes to reference 504. The electronic device determines whether the byte length for the given minimum packet value is zero in the packet-in-queue histogram (i.e., no bytes are marked with the minimum packet value). If that byte length for the given minimum packet value is not zero, that means the given minimum packet value is marked on at least one byte of packets that is current in the queue, thus the given minimum packet value is a valid minimum packet value, and the process ends. Otherwise, the flow goes to reference 510, where the given minimum packet value is increased (by one in this example, but increased in another stride value may be implemented in another embodiment of the invention).

The flow then returns to reference 506. If the byte length for the increased minimum packet value is still zero, the flow goes to reference 510, and the minimum packet value is increased again. Otherwise, at reference 506, when the byte length for the increased minimum packet value is no longer zero, the flow goes to reference 508, and the process ends.

By dynamically updating the minimum packet value of a data structure such as the packet-in-queue histogram, an electronic device may maintain the minimum packet value efficiently with information obtained from the data structure (the sum of the byte length of the data structure and the byte lengths of individual packet values).

Figure 6:
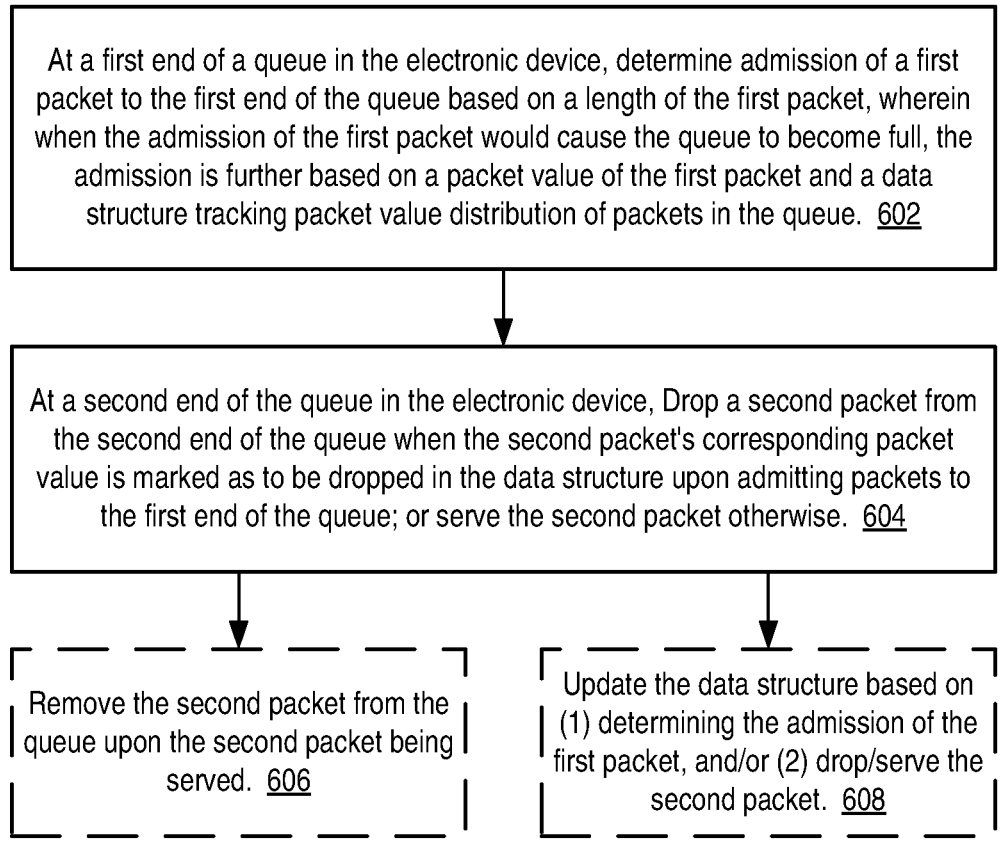
FIG. 6 illustrates how packets with packet values are processed in an electronic device per one embodiment of the invention.

FIG. 6 illustrates how packets with packet values are processed in an electronic device per one embodiment of the invention. Method 600 may be performed within an electronic device such as the node 100. The queue for the packets to enter into and to exit from is the queue 120 in one embodiment. The operations include enqueuing packets at one end of the queue and dequeuing the packets at the opposite end of the queue. In one embodiment, the queue a first-in and first-out queue for the packets to be served.

At reference 602, at a first end of a queue in the electronic device, admission of a first packet to the first end of the queue is determined based on a length of the first packet. When the admission of the first packet would cause the queue to become full, the admission is further based on a packet value of the first packet and a data structure tracking packet value distribution of packets in the queue. The admission of the first packet is discussed in further details herein above relating to the enqueuing process of FIG. 3.

In one embodiment, the data structure comprises a first histogram of first bytes of packets to be processed, and the first bytes of packets are distributed per packet values. In one embodiment, the first histogram is a packet-in-queue histogram such as the packet-in-queue histogram (HIN) 202.

In one embodiment, the data structure also comprises a second histogram of second bytes of packets to be dropped, and the second bytes of packets are distributed per packet values. In one embodiment, the second histogram is a packet-drop histogram such as the packet-drop histogram (HDROP) 204.

In one embodiment, the determination of the packet admission includes the following: when the packet value is higher than a minimum packet value in the first histogram, as many bytes with the minimum packet value as needed from the first histogram to the second histogram to accommodate the first packet. In one embodiment, the minimum packet value is the PVmin discussed herein above, and the move is discussed in more details herein above (e.g., the discussion relating to reference 312).

In one embodiment, the queue is determined to be full when a sum of packet lengths corresponding to packet values in the first histogram is over a threshold. The first histogram tracks the packet lengths of packets that are in the queue already per packet value, thus the sum of the packet lengths in the first histogram may indicate the current queue length, and the threshold may be the maximum queue length allowed of the queue in the electronic device. Thus, when the sum of packet lengths in the first histogram is over the threshold, it indicates that the queue is full in the embodiment.

In one embodiment, the determination of the packet admission includes, when the packet value is equal to or lower than a minimum packet value in the first histogram, the electronic device denies the first packet from admitting to the queue. In other words, the first packet is dropped prior to entering the queue.

At reference 604, at a second end of the queue in the electronic device, a second packet is dropped from the second end of the queue when the second packet's corresponding packet value is marked as to be dropped in the data structure upon admitting packets to the first end of the queue, or the second packet is served otherwise. The serving of the second packet is discussed in further details herein above relating to the dequeuing process of FIG. 4.

In one embodiment, the second packet is removed from the queue at reference 606 upon the second packet being served. In one embodiment, the data structure is updated at reference 608 based on one or more of determining the admission of the first packet and dropping/serving the second packet.

Note that while in some embodiments the data structure contains two histograms such as a packet-in-queue histogram and a packet-drop histogram, in other embodiments the data structure may contain a single histogram or other structures such as a map, a list, an array, a file, a table, a database (relational database or mongo database) so that the single histogram or the one/more other structures tracks packet value distributions of packets at the entry and exit of a queue of an electronic device in a communications network. Such data structure aids the electronic device to admit packets in the queue and to serve the packets exiting the queue.

Through using packet values (which indicates drop precedence in one embodiment), embodiments of the invention process packets efficiently by making determination at the two ends of a queue, without dropping packets in the middle of the queue. Additionally, embodiments of the invention do not involve any complex pre-tuning of the control loops, and maintaining the data structure such as the packet-in-queue histogram and the packet-drop histogram is well within the processing capability of many electronic devices such as the node 100.

In one embodiment, the packet values indicate the drop precedence of the packets relating to method 600. FIGS. 7A-B illustrate different ways that packet values may be conveyed per embodiments of the invention. In FIG. 7A, the packet value is embedded within the packets to be processed by an electronic device performing method 600. In this case, a packet includes a flow identifier (ID) 702 to indicate the traffic flow that the packet belongs to, and the packet value 704 of a packet is embedded within the packet while the packet is enqueued. For example, the first and second packets belong to the same traffic flow with the flow ID of 1, and they have different packet values 100 and 10 respectively (they may be packets of different priorities within the traffic flow). Each packet has its respective payload. When the packet values are embedded within the packets arrived at a queue (reference 701), an electronic device may examine packets' headers and determine how to process the packets per methods 300-600.

Alternatively, a packet value may be mapped to a packet using a data structure per embodiment of the invention as illustrated in FIG. 7B. In FIG. 7B, a mapping data structure 710 may be maintained by the electronic device that processes arrived packets. The mapping may be between a packet identifier (ID) 712 and its corresponding packet value. A packet ID 712 may be a pointer, or a hash value of packet header information or a flow identifier (ID) in one embodiment; and in an alternative embodiment, the packet ID 712 may be an array containing multiple values in a packet header. The mapping data structure 710 may be a map, a list, an array, a file, a table, a database (relational database or mongo database), etc. Further, the discussion of columns and rows within these tables is arbitrary; while one implementation may choose to put entries in rows, it is trivial to modify the data structure to put entries in columns instead.

Exemplary Processing Results

Figure 8A:
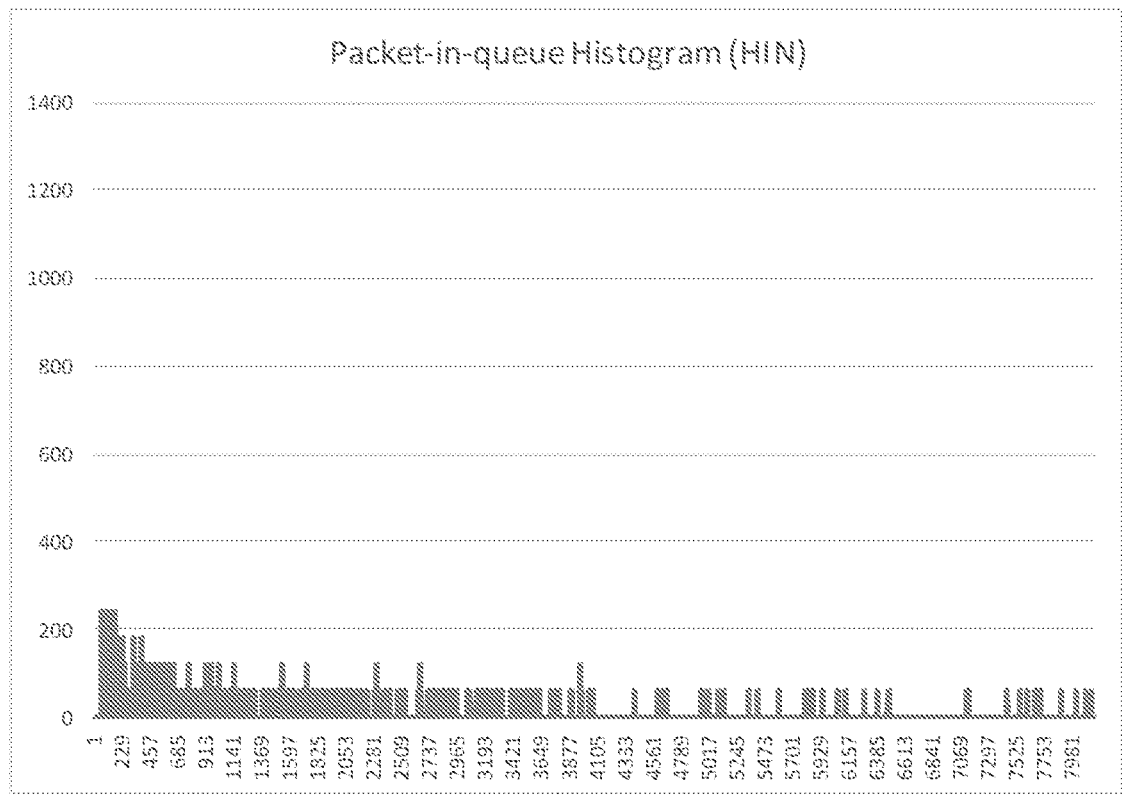
FIGS. 8A-B illustrate a packet-in-queue histogram and a packet-drop histogram per one embodiment of the invention.

Embodiments of the invention have been implemented and the processing results show that the packets with lower packet values are dropped while packets with higher packet values are served by a node in the network. An embodiment using a packet-in-queue histogram and a packet-drop histogram is illustrated in FIGS. 8A-B.

The embodiment is implemented in C programming language with standard libraries. The minimum cost of an enqueue-dequeue cycle is 25-25 cycles on a x86 CPU. When packet drop happens, the cost can increase, depending on how big the packet value interval is on the data structure such as the packet-in-queue histogram and the packet-drop histogram discussed herein above. 5,000 packets, each 60 bytes long arrives at a packet processing queue (e.g., the queue 120). The maximum queue length is 35,000 bytes. That is, 300,000 bytes entering the queue over time. FIG. 8A illustrates a packet-in-queue histogram per one embodiment of the invention. The packet-in-queue histogram is sorted on packet values on the x-axis, and the packet values are in the range of 1 and around 8,000. Some packet values have more bytes such as the lower packet values between 1 and 200, and the byte length per packet value can be over 200. Other packet values have much less bytes such as the higher packet values over 7,000, and the byte length per packet value is less than 100. Indeed, the bytes at the higher packet values are sparsely populated, indicating that in this embodiment, the incoming packets have mostly lower packet values.

Figure 8B:
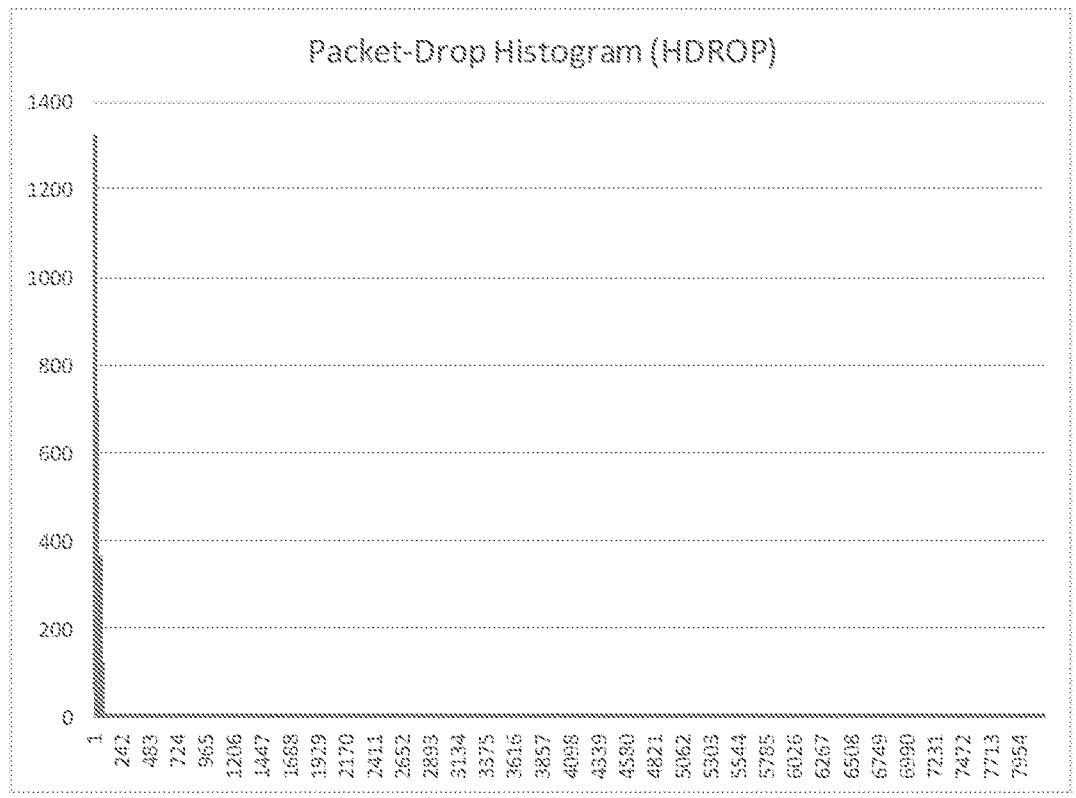

FIG. 8B illustrates a packet-drop histogram per the same embodiment of the invention. As illustrated, the packet drop focuses on the packets with low packet values. That is, packets with higher packet values are served while some packets with lower packet values are dropped. The lower the packet values, the more likely that the corresponding packets are dropped. The packet drop shows that bytes of the dropped packet are at the peak at the lowest packet values. In this embodiment, out of the 300,000 bytes in the 5,000 packets, only 52,320 bytes of the packets are served, and the rest with low packet values are dropped. Thus, the packet process operates as expected.

Electronic Devices Implementing Embodiments

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs). Each network device may be the node 100 implementing the methods 300-600.

Two of the exemplary ND implementations in FIG. 9A are: 1) a special-purpose network device 902 that uses custom application-specific integrated-circuits (ASICs) and a special-purpose operating system (OS); and 2) a general-purpose network device 904 that uses common off-the-shelf (COTS) processors and a standard OS.

The special-purpose network device 902 includes networking hardware 910 comprising a set of one or more processor(s) 912, forwarding resource(s) 914 (which typically include one or more ASICs and/or network processors), and physical network interfaces (NIs) 916 (through which network connections are made, such as those shown by the connectivity between NDs 900A-H), as well as non-transitory machine-readable storage media 918 having stored therein networking software 920. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A). The networking software 920 may implement methods 300-600 in one embodiment and the packets to be processed are the packets received at the special-purpose network device 902.

The special-purpose network device 902 is often physically and/or logically considered to include: 1) a ND control plane 924 (sometimes referred to as a control plane) comprising the processor(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the processor(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/

Transport Layer Security (TLS), Intrusion Detection System (ID S), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general-purpose network device 904 includes hardware 940 comprising a set of one or more processor(s) 942 (which are often COTS processors) and physical NIs 946, as well as non-transitory machine-readable storage media 948 having stored therein software 950. During operation, the processor(s) 942 execute the software 950 to instantiate one or more sets of one or more applications 964A-R. The networking software 920 may implement methods 300-600 in one embodiment, and the packets to be processed are the packets received at the general-purpose network device 904. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization of the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the invention are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-R and the physical NI(s) 946, as well as optionally between the instances 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out to the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 9C:
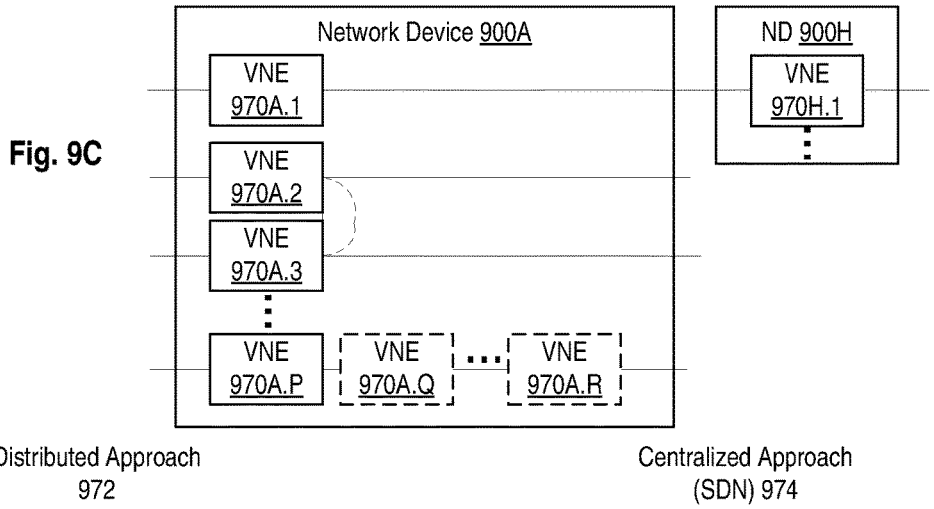
FIG. 9C illustrates various exemplary ways in which virtual network elements (VNEs) may be coupled according to some embodiments of the invention.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general-purpose network device 904, one or more of the software instances 962A-R may operate as servers; the same would be true for the hybrid network device 906; in the case of the special-purpose network device 902, one or more such servers could also be run on a virtualization layer executed by the processor(s) 912; in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 9D:
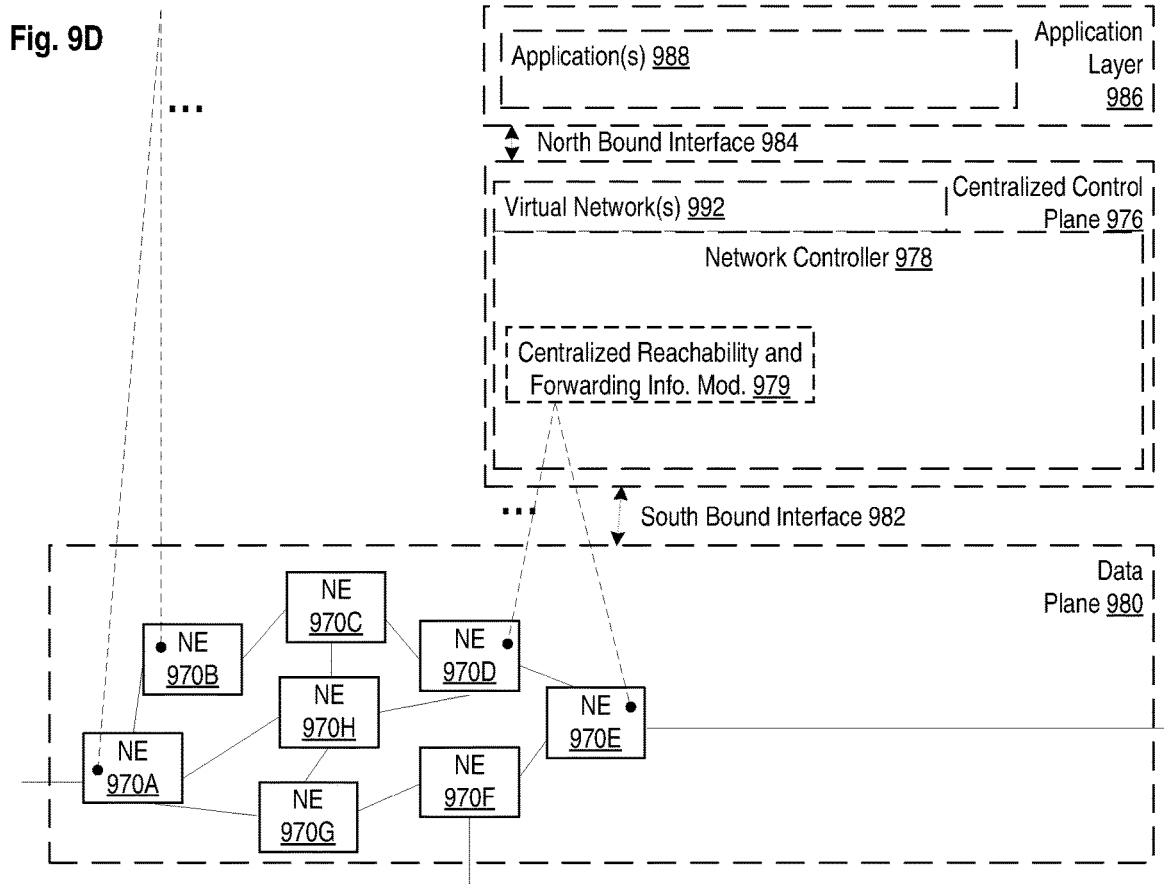
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 970A-H (e.g., the processor(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general-purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs. Note that the centralized reachability and forwarding information module 979 may implement methods 300-600 in one embodiment, and the packets to be processed are the packets received at the network controller 978.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the processor(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general-purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general-purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to the raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
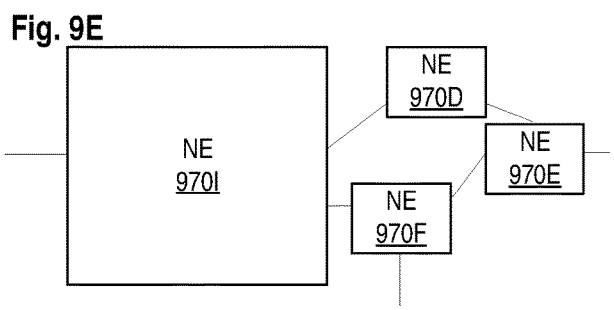
FIG. 9E illustrates the simple case of where each of the NDs implements a single NE, but a centralized control plane has abstracted multiple of the NEs in different NDs into (to represent) a single NE in one of the virtual network(s), according to some embodiments of the invention.
Figure 9F:
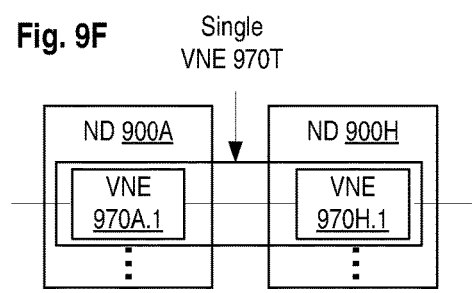
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
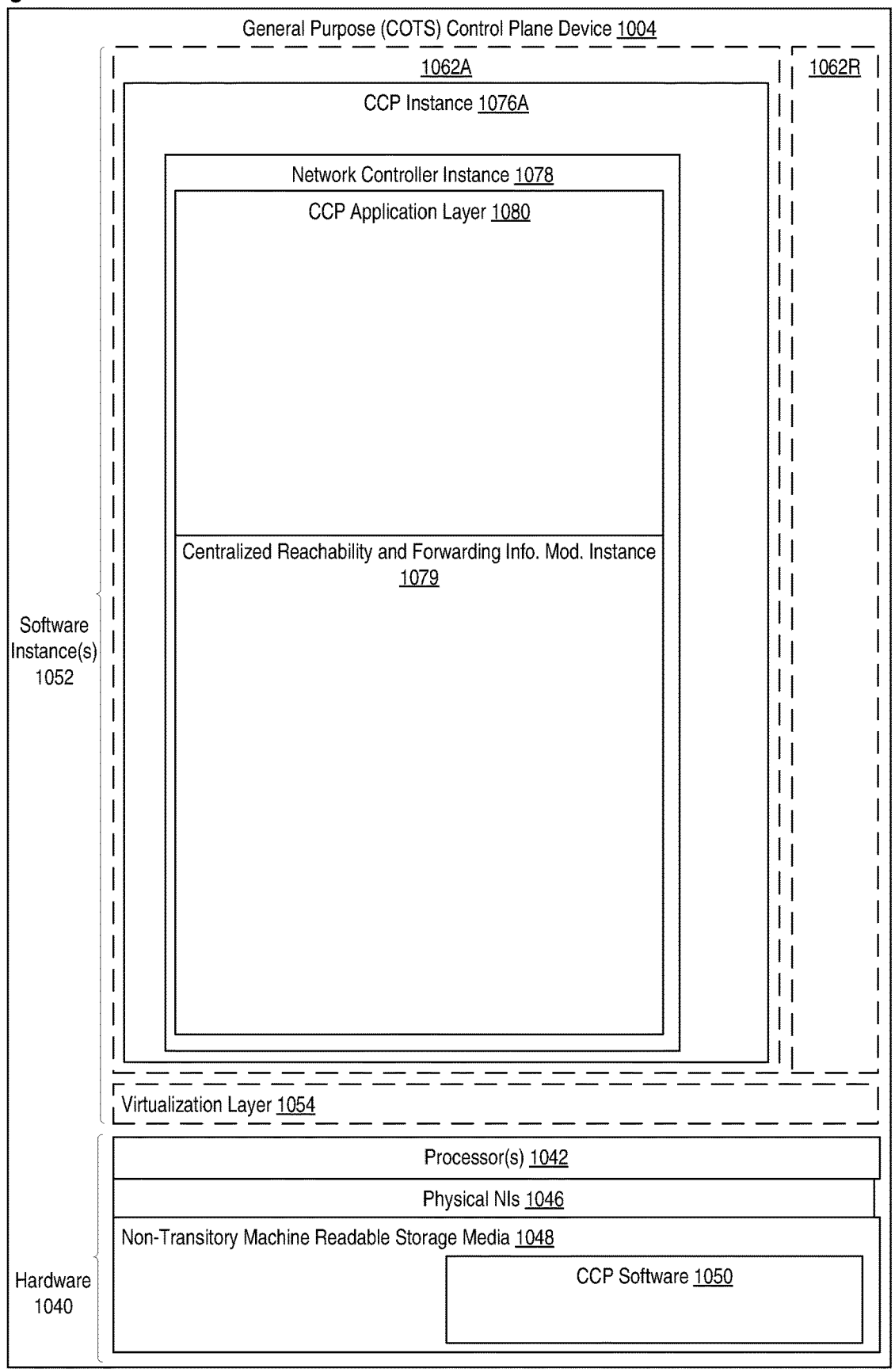
FIG. 10 illustrates a general-purpose control plane device with centralized control plane (CCP) software according to some embodiments of the invention.

Similar to the network device implementations, the electronic device(s) running the centralized control plane 976, and thus the network controller 978 including the centralized reachability and forwarding information module 979, may be implemented in a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 10 illustrates, a general-purpose control plane device 1004 including hardware 1040 comprising a set of one or more processor(s) 1042 (which are often COTS processors) and physical NIs 1046, as well as non-transitory machine-readable storage media 1048 having stored therein centralized control plane (CCP) software 1050. Note that the CCP software 1050 may implement methods 300-600 in one embodiment, and the packets to be processed are the packets received at the general-purpose control plane device 1004.

In embodiments that use compute virtualization, the processor(s) 1042 typically execute software to instantiate a virtualization layer 1054 (e.g., in one embodiment the virtualization layer 1054 represents the kernel of an operating system (or a shim executing on a base operating system) that allows for the creation of multiple instances 1062A-R called software containers (representing separate user spaces and also called virtualization engines, virtual private servers, or jails) that may each be used to execute a set of one or more applications; in another embodiment the virtualization layer 1054 represents a hypervisor (sometimes referred to as a virtual machine monitor (VMM)) or a hypervisor executing on top of a host operating system, and an application is run on top of a guest operating system within an instance 1062A-R called a virtual machine (which in some cases may be considered a tightly isolated form of software container) that is run by the hypervisor; in another embodiment, an application is implemented as a unikernel, which can be generated by compiling directly with an application only with a limited set of libraries (e.g., from a library operating system (LibOS) including drivers/libraries of OS services) that provide the particular OS services needed by the application, and the unikernel can run directly on hardware 1040, directly on a hypervisor represented by virtualization layer 1054 (in which case the unikernel is sometimes described as running within a LibOS virtual machine), or in a software container represented by one of instances 1062A-R). Again, in embodiments where compute virtualization is used, during operation an instance of the CCP software 1050 (illustrated as CCP instance 1076A) is executed (e.g., within the instance 1062A) on the virtualization layer 1054. In embodiments where compute virtualization is not used, the CCP instance 1076A is executed, as a unikernel or on top of a host operating system, on the "bare metal" general-purpose control plane device 1004. The instantiation of the CCP instance 1076A, as well as the virtualization layer 1054 and instances 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user-interfaces). At a more abstract level, this CCP application layer 1080 within the centralized control plane 976 works with virtual network view(s) (logical view(s) of the network) and the middleware layer provides the conversion from the virtual networks to the physical view.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDsNEs/VNEs of the data plane 980 may receive different messages, and thus different forwarding information. The data plane 980 processes these messages and programs the appropriate flow information and corresponding actions in the forwarding tables (sometimes referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in an electronic device for handling packets in a communications network, the method comprising:
   at a first end of a queue in the electronic device, admitting a first packet to the first end of the queue based on a length of the first packet, wherein when the admission of the first packet would cause the queue to become full, the admission is further based on a packet value of the first packet and a first histogram that indicates how many bytes within packets are in the queue per packet values; and
   at a second end of the queue in the electronic device,
      dropping a second packet from the second end of the queue when the second packet's corresponding packet value is marked as to be dropped in a second histogram that indicates distribution of bytes per packet values to be dropped, wherein the second packet is dropped only from the second end of the queue, or
      serving the second packet otherwise.

2. The method of claim 1, wherein admitting the first packet based on the length of the first packet comprises:
when the packet value is higher than a minimum packet value in the first histogram, moving as many bytes with the minimum packet value as needed from the first histogram to the second histogram to accommodate the first packet.

3. The method of claim 1, wherein the queue is determined to be full when a sum of packet lengths corresponding to packet values in the first histogram is over a threshold.

4. The method of claim 1, wherein admitting the first packet based on the length of the first packet comprises:
when the packet value is equal to or lower than a minimum packet value in the first histogram, denying the first packet from admitting to the queue.

5. The method of claim 1, further comprising:
removing the second packet from the queue upon the second packet being served.

6. The method of claim 1, wherein the packet value indicates drop precedence of the first packet.

7. An electronic device to handle packets in a communication network, the electronic device comprising:
a non-transitory machine-readable medium to store instructions; and
a processor coupled with the non-transitory machine-readable medium to process the stored instructions to perform:
at a first end of a queue in the electronic device,
admitting a first packet to the first end of the queue based on a length of the first packet, wherein when the admission of the first packet would cause the queue to become full, the admission is further based on a packet value of the first packet and a first histogram that indicates how many bytes within packets are in the queue per packet values; and
at a second end of the queue in the electronic device,
dropping a second packet from the second end of the queue when the second packet's corresponding packet value is marked as to be dropped in a second histogram that indicates distribution of bytes per packet values to be dropped, wherein the second packet is dropped only from the second end of the queue, or
serving the second packet otherwise.

8. The electronic device of claim 7, wherein admitting the first packet based on the length of the first packet comprises:
when the packet value is higher than a minimum packet value in the first histogram, dropping as many bytes with the minimum packet value as needed to accommodate the first packet.

9. The electronic device of claim 7, wherein the queue is determined to be full when a sum of packet lengths corresponding to packet values in the first histogram is over a threshold.

10. The electronic device of claim 7, wherein admitting the first packet based on the length of the first packet comprises:
when the packet value is equal to or lower than a minimum packet value in the first histogram, denying the first packet from admitting to the queue.

11. The electronic device of claim 7, wherein the electronic device is further to perform:
removing the second packet from the queue upon the second packet being served.

12. The electronic device of claim 7, wherein the packet value indicates drop precedence of the first packet.

13. The electronic device of claim 7, wherein the packet value is embedded within the first packet.

14. The electronic device of claim 7, wherein the packet value is mapped to the first packet in the electronic device.

15. The electronic device of claim 7, wherein the electronic device is further to:
update the first and second histograms based on one or more of:
determination of the admission of the first packet, and
dropping or serving of the second packet.

16. A non-transitory machine-readable storage medium that provides instructions, which when executed by a processor of an electronic device, cause the processor to perform operations comprising:
at a first end of a queue in the electronic device, admitting a first packet to the first end of the queue based on a length of the first packet, wherein when the admission of the first packet would cause the queue to become full, the admission is further based on a packet value of the first packet and a first histogram that indicates how many bytes within packets are in the queue per packet values; and
at a second end of the queue in the electronic device,
dropping a second packet from the second end of the queue when the second packet's corresponding packet value is marked as to be dropped in a second histogram that indicates distribution of bytes per packet values to be dropped, wherein the second packet is dropped only from the second end of the queue, or
serving the second packet otherwise.

17. The method of claim 1, wherein the admission based on the packet value of the first packet and the first histogram further comprises moving bytes from the first histogram to the second histogram.

18. The method of claim 1, wherein the packet value is embedded within the first packet.

19. The method of claim 1, wherein the packet value is mapped to the first packet in the electronic device.

20. The method of claim 1, wherein the queue is a first-in and first-out queue for the packets.

* * * * *